(No Model.)
A. ROLLASON & J. H. HAMILTON.
GAS OR VAPOR ENGINE.
No. 456,853. Patented July 28, 1891.
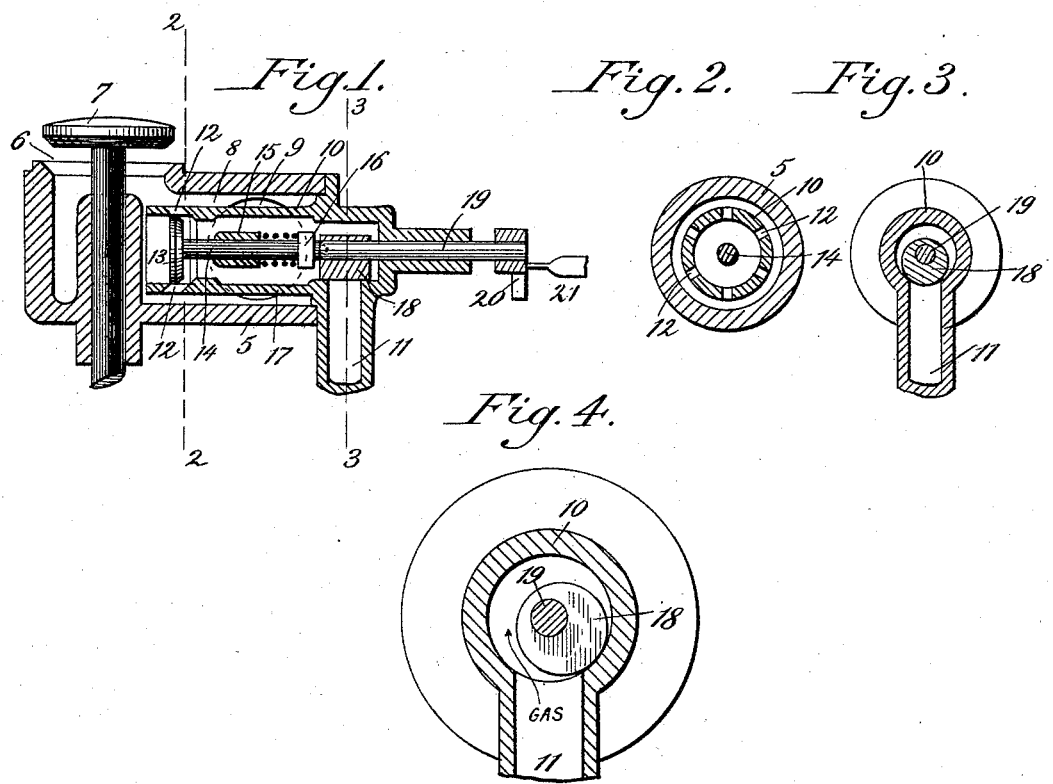

UNITED STATES PATENT OFFICE.

ARTHUR ROLLASON AND JOHN HENRY HAMILTON, OF SANDIACRE, ENGLAND.

GAS OR VAPOR ENGINE.

SPECIFICATION forming part of Letters Patent No. 456,853, dated July 28, 1891.

Application filed March 26, 1891. Serial No. 386,531. (No model.) Patented in England October 18, 1889, No. 16,434.

*To all whom it may concern:*

Be it known that we, ARTHUR ROLLASON and JOHN HENRY HAMILTON, British subjects, residing at Sandiacre, in the county of Derby, England, have invented certain new and useful Improvements in Gas or Vapor Engines, (patented in Great Britain October 18, 1889, No. 16,434;) and we do hereby declare the following to be a full, clear, and exact description of the invention, such as will enable others skilled in the art to which it appertains to make and use the same.

In an application for Letters Patent of the United States filed of even date herewith, Serial No. 386,530, we have shown and described a gas or vapor engine provided with an admission-chamber for the entrance of the explosive mixture, and wherein the valve governing the opening between the combustion-chamber of the engine and the admission-chamber and the valve governing the gas-ports are independent one of the other.

The present invention relates to a modified form of admission-chamber provided with a separate throttle-valve for the gas-supply pipe, the arrangement being such as to permit the air to enter through an annular passage around the gas-valve casing, and the gas escaping from said casing through lateral slits arranged circumferentially so as to facilitate the intermingling of the two fluids on their way into the combustion-chamber. The slits or ports in the gas-valve casing are governed by a gas-port valve having a rectilinear reciprocating movement, and whose stem is in line with the axis of the throttle-valve, so as to permit the two valves to operate without interference with each other.

In the drawings illustrative of the invention, Figure 1 represents a longitudinal central section of the improved form of admission-chamber, and indicates its connection with the governor. Fig. 2 represents a section on the line 2 2 of Fig. 1. Fig. 3 represents a section on the line 3 3 of Fig. 1, and Fig. 4 represents on an enlarged scale a similar section to that shown in Fig. 3, the throttle-valve being shown as partially opened.

Similar letters of reference indicate similar parts throughout the several views.

Referring to the drawings, 5 indicates the main body portion or casing of the admission-chamber provided with an opening 6, governed by the lift-valve 7 and having a side channel 8, provided with a port 9, through which the air enters on its way into the explosion-cylinder.

Within the side passage 8 is located the gas-valve casing 10, communicating by means of the conduit 11 with the source of gas-supply and having at its inner end elongated slits 12, serving as gas-ports and governed by the gas-port valve 13. The gas-port valve is provided with a stem 14, which passes through a fixed bearing 15. It has a fixed collar 16, between which and the bearing is located a spring 17, the tendency of the spring being to close the valve 13, so as to shut off the outflow through the elongated slits 12. The gas-supply conduit 11 is provided with a throttle-valve 18, mounted eccentrically upon a stem 19, said stem being in line with the stem 14 of the gas-port valve and being hollowed out conically at the point of juncture of the two stems, so as to receive the corresponding conical portion of the stem 14, whereby the stem 19 is adapted to rock without rocking the stem 14.

At the outer end of the stem 19 is secured an arm or sector 20, which it will be understood is adapted to be rocked by the rise and fall of a governor. This arm or sector 20 is shown in its lowest working position, corresponding to the lowest working position of the governor-balls, in which position the gas-supply is cut off by the throttle-valve 18. In starting the governor may be held up by a catch in the usual manner, so as to permit the entrance of gas to the throttle-valve.

The mode of operation will be apparent. The rise or fall of the governor will rock the eccentric throttle-valve so as to admit an amount of gas through the supply-pipe 11 corresponding to the position of the governor and the work to be performed by the engine. The gas thus admitted to the gas-valve casing 10 will (when the valve 13 is pushed inwardly by the push-piece 21, thereby causing the valve to uncover the slits 12 correspondingly) flow through said slits, thereby being intimately admixed with the air on its way to the admission-port 6.

We prefer to employ in connection with the form of admission-chamber and throttle-valve shown in this application the rotary ball-governor shown in our British patent hereinbefore referred to; but it is evident that other forms of governor may be used for operating the throttle-valve with similar results.

Having thus described the invention, what we claim, is—

1. In a gas or vapor engine, an admission-chamber consisting of a gas-valve casing provided with circumferential slits, a valve governing said slits, an outer casing for the admission of air, said outer casing forming an annular chamber about the gas-valve casing, and an admission-valve covering the outlet of the annular chamber and governing the entrance of the mixture of gas and air into the combustion-chamber, substantially as described.

2. In a gas or vapor engine, an admission-chamber consisting of a gas-valve casing provided with circumferential slits, a valve governing said slits, a throttle-valve governing the entrance of gas into the gas-valve casing, an outer casing for the admission of air, said outer casing forming an annular chamber about the gas-valve casing, and an admission-valve governing the entrance of the mixture of gas and air into the combustion-chamber, substantially as described.

3. In a gas or vapor engine, an admission-chamber consisting of a gas-valve casing having supply and exit openings, a valve governing the exit-openings and having a longitudinal movement, and a rotatory throttle-valve governing the supply-opening, the throttle-valve being eccentric upon its spindle, substantially as described.

4. In a gas or vapor engine, an admission-chamber consisting of a gas-valve casing having supply and exit openings, a valve governing the exit-openings and having a longitudinal movement, and a rotatory throttle-valve governing the supply-opening, the exit-opening valve being spring-seated, and the throttle-valve being eccentric upon its spindle, substantially as described.

5. In a gas or vapor engine, an admission-chamber provided with a gas-valve casing having admission and exit openings, a valve fitting the casing and governing the exit-openings, and an eccentric throttle-valve governing the admission-openings, substantially as described.

6. In a gas or vapor engine, an admission-chamber provided with a gas-valve casing having admission and exit openings, a valve fitting the casing and governing the exit-openings, and an eccentric throttle-valve governing the admission-opening, the spindles of said valves being in line with each other, substantially as described.

7. In a gas or vapor engine, an admission-chamber provided with a gas-valve casing having admission and exit openings, a valve fitting the casing and governing the exit-openings, and an eccentric throttle-valve governing the admission-openings, the spindle of said valves being in line with each other and the end of the one spindle being hollowed out to fit the end of the other, substantially as described.

In testimony whereof we affix our signatures in presence of two witnesses.

ARTHUR ROLLASON.
JOHN HENRY HAMILTON.

Witnesses:
JOSEPH GEORGE NORDEN,
GEORGE EDWARD BERWICK.